United States Patent [19]

Weatherill

[11] Patent Number: 5,391,477
[45] Date of Patent: Feb. 21, 1995

[54] IN SITU MODIFICATION OF GELATIN CARBOXYL GROUPS

[75] Inventor: Timothy D. Weatherill, Hendersonville, N.C.

[73] Assignee: E. I. du Pont de Nemours and Company, Wilmington, Del.

[21] Appl. No.: 172,292

[22] Filed: Dec. 22, 1993

Related U.S. Application Data

[63] Continuation of Ser. No. 905,426, Jun. 29, 1992, abandoned.

[51] Int. Cl.$^6$ .............. G03C 1/005; G03C 1/494; G03C 1/30; G03C 1/76
[52] U.S. Cl. .............. 430/642; 430/539; 430/621; 430/640; 530/354
[58] Field of Search .............. 430/539, 621, 640, 642; 530/354

[56] References Cited

U.S. PATENT DOCUMENTS

| | | | |
|---|---|---|---|
| 3,645,743 | 2/1972 | Mucke et al. | 96/111 |
| 4,939,079 | 7/1990 | Wolff et al. | 430/558 |
| 4,978,607 | 12/1990 | Roche et al. | 430/642 |
| 5,087,694 | 2/1992 | Dumas et al. | 430/621 |
| 5,316,902 | 5/1994 | Specht et al. | 430/621 |

FOREIGN PATENT DOCUMENTS

| | | | |
|---|---|---|---|
| 0247482A2 | 12/1987 | European Pat. Off. | |
| 0283938 | 9/1988 | European Pat. Off. | 430/621 |
| 0519329A1 | 12/1992 | European Pat. Off. | |
| 934397 | 7/1967 | France | |
| 3253839 | 11/1991 | Japan | 430/640 |
| 4142534 | 5/1992 | Japan | 430/640 |
| 9120014 | 12/1991 | WIPO | |

OTHER PUBLICATIONS

T886,014 Defensive Publication Published May 11, 1971 886 OG 215 Gelatin With Improved Chemical Setting Properties.

Derwent Abstract, Nitta Gelatin Inc., Improved Alkali-Treated Gelatin and Preparation Thereof, JP2305876, Abstract, Dec. 19, 1990.

T. D. Weatherill, R. W. Henning and K. A. Smith, Solid State Structural Characterization of Gelatin Crosslinked with a Variety of Hardeners, *Journal of Photographic Science*, Nos. 5/6, Bath, GB, 40 (1992), 220-221, Sep. 15-20, 1991.

*Primary Examiner*—Janet C. Baxter
*Assistant Examiner*—J Pasterczyk

[57] ABSTRACT

A photographic element comprising a modified gelatin whereby the modification results in carbamoyl groups by forming peptide bonds using fast-acting hardener. The derivatization involves initial reaction with a carboxyl activator followed by addition of a substituted amine thereby forming an amide linkage on the polypeptide chain. The resulting gelatin and photographic elements comprising such gelatin have a decreased propensity for water absorption without the loss of sensitometric properties.

3 Claims, No Drawings

IN SITU MODIFICATION OF GELATIN CARBOXYL GROUPS

This is a continuation of application Ser. No. 07/905,426, filed Jun. 29, 1992, now abandoned.

FIELD OF INVENTION

This invention relates to gelatin wherein pendant carboxyl groups of the gelatin are modified to impart practical improvements in the properties thereof. More specifically this invention relates to the addition of antistatic and hydrophobic properties to regions of a gelatin molecule. Even more specifically this invention relates to the use of such modified gelatin in a photographic element.

BACKGROUND OF THE INVENTION

Gelatin has long been exploited as a binder in photographic elements wherein silver salts, dyes and other adjuvants are harbored therein. Gelatin is generally considered to be a protein comprising amino acid residues wherein an acid group of an amino acid is linked to a base group of another amino acid to form a polypeptide chain. The amino acid residues typically contain both amine and carboxylic acid moieties which are pendant or branching off of the main polypeptide chain. It is these pendant amines and carboxylic acid moieties which form the basis for many of the properties of gelatin.

For use in a photographic emulsion it is typically preferred to add gelatin and a hardening agent to an aqueous photographic emulsion prior to coating the emulsion on a support. Upon removal of water and other volatiles from the emulsion the peptide coupling or carboxyl activated hardening agent reacts to form bonds between the pendant amines and pendant carboxylic acid groups on the gelatin backbone. The hardening, known in the art as "instant" hardening or crosslinking, imparts a rigidity to the gelatin structure thereby protecting silver salts, dyes and adjuvants from migrating within the film structure. Gelatin is also advantageous in supplemental layers below or above the emulsion for abrasion protection, dye localization and the like.

Prior to displaying an exposed photographic element it is typically necessary to process the image either by heat or by chemicals as known in the art. Chemical processing involves introducing the photographic element to various chemicals which develop the image and remove excess silver salts, dyes and adjuvants. After chemical processing the photographic element is preferably dried thereby providing an image. The pendant carboxyls are detrimental to the drying process due to the propensity with which carboxyl groups absorb excessive water. Therefore it has long been desired in the art to block or more fully crosslink the gelatin carboxyls to provide a film element which can be dried more rapidly and thoroughly.

Yet another long felt need in the art is a means of decreasing the effect of static electricity generated as a photographic element traverses through various automatic processing machines. This has been accomplished by various techniques as known in the art all of which require either a supplemental layer with antistatic adjuvants or the use of various surfactants within the photographic emulsion. Auxiliary layers require an additional manufacturing step which is undesirable and surfactants within the photographic element are known to migrate and can affect the sensitometric performance of the film.

In recent years discrete layers in a photosensitive element containing co- or terpolymers with carboxyl and sulfonated comonomers have been claimed as providing superior antistatic protection. A significant shortcoming of these inventions is the excessive water absorption due to insufficient crosslinking of the carboxyl groups.

SUMMARY OF THE INVENTION

An improved gelatin is provided which has lower affinity for water, improved antistatic properties and other advantages which can be prepared simply and without additional manufacturing steps. These and other advantages are provided in a modified gelatin wherein at least one carboxylic acid moiety of gelatin is modified to form an amide of the formula

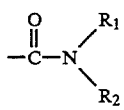

wherein $R_1$ and $R_2$ independently represent hydrogen, substituted or unsubstituted alkyl of 1–10 carbons, substituted or unsubstituted aryl of 6–14 carbons, substituted or unsubstituted arylalkyl of 7–20 carbons. The process comprises the steps of:

(a) reacting said gelatin with a carboxyl activating agent; and (b) reacting a product of step (a) with an amine of the formula $NHR_1R_2$ wherein $R_1$ and $R_2$ are as defined above.

A further provision of this application is a photographic element which utilizes modified gelatin described above with the advantage being the ability to form the modified gelatin within the confines of the photographic emulsion. A subsequent photographic element prepared in accordance with the teachings herein demonstrates lower water absorption without loss of sensitometric properties.

DETAILED DESCRIPTION OF THE INVENTION

In solution, gelatin forms interconnected strands which may be held in close proximity by a multitude of intramolecular and intermolecular hydrogen bonds. These interconnected strands impart many of the inherent properties of gelatin such as the ability to set upon drydown or cooling. Also inherent in gelatin strands are a multitude of pendant carboxylic acid groups and amine groups as illustrated below:

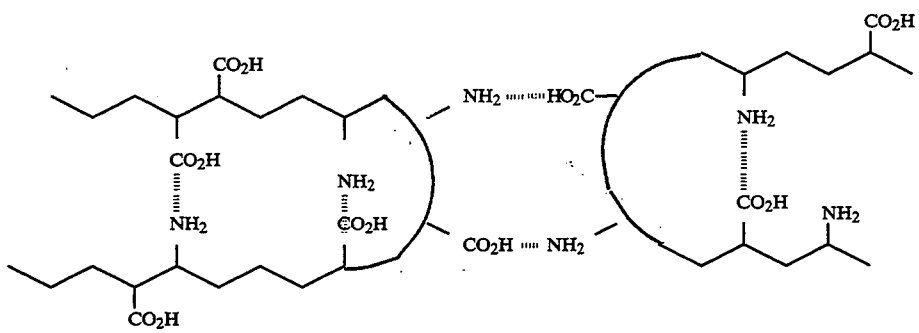

It is well known in the art that crosslinking or hardening of the gelatin with a carboxyl activator replaces the hydrogen bond with a more rigid peptide bond thereby substantially maintaining the relative orientation of the strands of gelatin with a minor effect on the bulk of the pendant carboxylic acid and pendant amine groups as illustrated below:

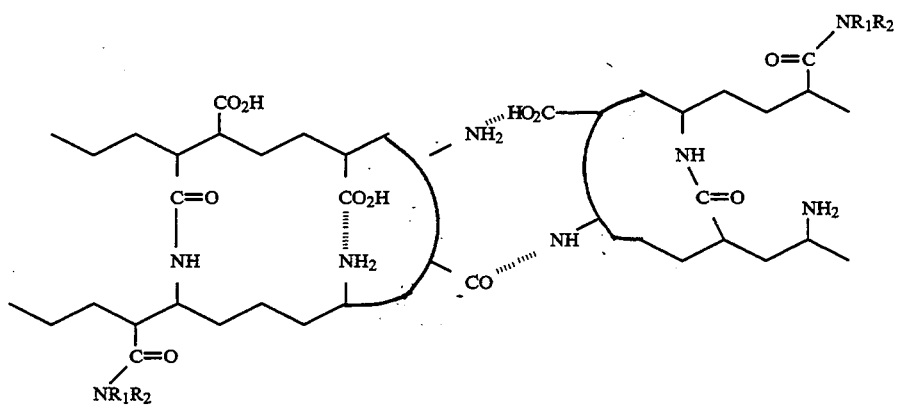

In the present invention the hardener, also known as a peptide coupler, is labeled herein as a carboxyl activating agent. This activating agent can be represented by a formula AX which is chosen such that the intermediate formed from carboxylic acid groups in the gelatin will react with an amine to form the amide. In the formula AX, A is capable of displacement from X upon nucleophilic attack by a carboxylic acid and X is capable of displacement from the activated carboxyl upon nucleophilic attack by an amine.

In the procedure of the present invention a reaction with an amine of the formula $NHR_1R_2$ takes place resulting is a structure substantially as illustrated below

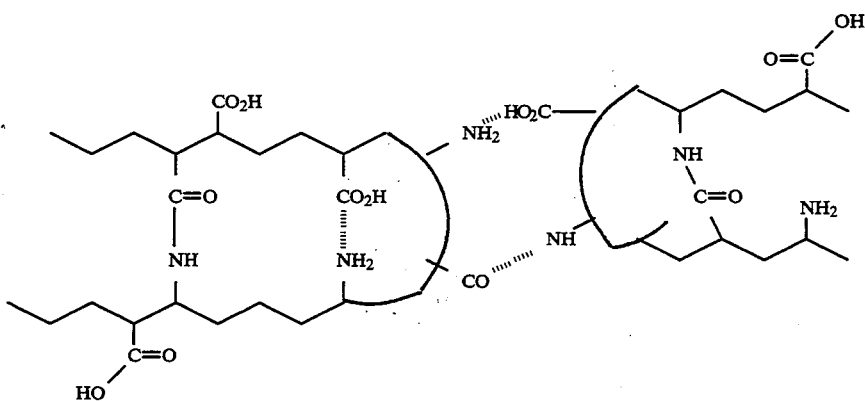

wherein the substitutents $NR_1R_2$ are dependant on the amine used for derivatization. Preferred amines which are included within the teachings of the present invention include combinations of hydrophobic residues and residues which are capable of acting as antistatic agents. The amine can be defined as $R_1R_2NH$, wherein $R_1$ and $R_2$ in the amine and the resulting amide independently represent hydrogen, substituted or unsubstituted alkyl of 1-10 carbons, substituted or unsubstituted aryl of 6-14 carbons, substituted or unsubstituted arylalkyl of 7-20 carbons. Preferred substitutions include but are not limited to fluorine, chlorine, alcohol, amines, and the like. More preferred amines are those which contain at least one compact but highly hydrophobic group such as branched alkyl, substituted or unsubstituted fused ring and the like. Particularly preferred amines include those substituted by t-butyl, cyclohexyl, norbornane, norbornylene, norbornadiene, adamantane or similar groups. The most preferred amine is adamantane amine. Substituted or unsubstituted fluorinated alkyl, substituted or unsubstituted fluorinated aryl, substituted or unsubstituted fluorinated arylalkyl groups are preferred for use as an antistatic adjuvant. The $R_1$ and $R_2$ are understood to exclude gelatin.

Carboxyl activating agents suitable for use in the teachings herein are legion in number with the proviso that the carboxyl activator is capable of forming an amide when the activated carboxyl is allowed to react with an amine. Exemplary examples are taught in U.S. Pat. No. 4,942,068 and include but are not limited to

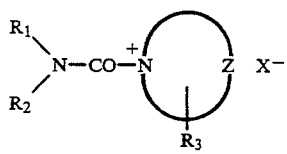
(a)

wherein $R_1$ represents alkyl, aryl or arylalkyl, $R_2$ has the same meaning as $R_1$ or represents alkylene, arylene, aralkylene or alkaralkylene, the second bond being attached to the group corresponding to the following formula

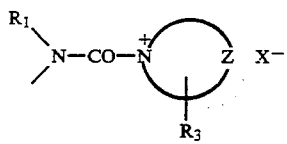

or $R_1$ and $R_2$ together represent the atoms required to complete an optionally substituted heterocyclic ring, for example a piperidine, piperazine or morpholine ring, the ring optionally being substituted, for example, by $C_1$-$C_3$ alkyl or halogen, $R_3$ represents hydrogen, alkyl, aryl, alkoxy, —NR$_4$—COR$_5$, —(CH$_2$)$_m$—NR$_8$R$_9$, —(CH$_2$)$_n$—CONR$_{13}$R$_{14}$ or

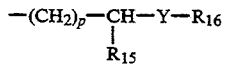

or a bridge member or a direct bond to a polymer chain, $R_4$, $R_6$, $R_7$, $R_9$, $R_{14}$, $R_{15}$, $R_{17}$, $R_{18}$ and $R_{19}$ being hydrogen or $C_1$-$C_4$ alkyl, $R_5$ represents hydrogen, $C_1$-$C_4$ alkyl or $NR_6R_7$, $R_8$—COR$_{10}$, $R_{10}$ represents $NR_{11}R_{12}$, $R_{11}$ represents $C_1$-$C_4$ alkyl or aryl, more especially phenyl, $R_{12}$ represents hydrogen, $C_1$-$C_4$ alkyl or aryl, more especially phenyl, $R_{13}$ represents hydrogen, $C_1$-$C_4$ alkyl or aryl, more especially phenyl, $R_{16}$ represents hydrogen, $C_1$-$C_4$ alkyl, $COR_{18}$ or $CONHR_{19}$, m is 1 to 3, n is 0 to 3, p is 2 to 3 and Y represents O or $NR_{17}$, or $R_{13}$ and $R_{14}$ together represent the atoms required to complete a substituted or unsubstituted heterocyclic ring, for example a piperidine, piperazine or morpholine ring, the ring optionally being substituted, for example, by $C_1$-$C_3$ alkyl or halogen, Z represents the carbon atoms required to complete a 5-membered or 6-membered aromatic heterocyclic ring, optionally with a linked benzene ring, and $X^-$ is an anion which is dropped if an anionic group is already attached to the remainder of the molecule;

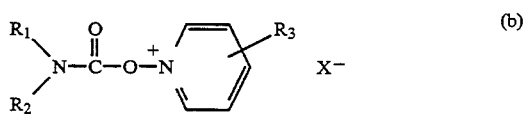
(b)

wherein $R_1$, $R_2$, $R_3$ and $X^-$ have the same meaning as defined for formula (a);

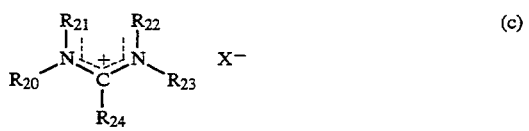
(c)

wherein $R_{20}$, $R_{21}$, $R_{22}$, $R_{23}$ represent $C_1$-$C_{20}$ alkyl, $C_6$-$C_{20}$ aralkyl, $C_5$-$C_{20}$ aryl, either unsubstituted or substituted by halogen, sulfo, $C_1$-$C_{20}$ alkoxy, N,N-di-$C_1$-$C_4$-alkyl-substituted carbamoyl and, in the case of aralkyl and aryl, by $C_1$-$C_{20}$ alkyl, $R_{24}$ is a group releasable by a nucleophilic agent and $X^-$ has the same meaning defined for formula (a); 2 or 4 or the substituents $R_{20}$, $R_{21}$, $R_{22}$ and $R_{23}$ may even be combined together with a nitrogen atom or the group

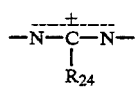

optionally with inclusion of further heteroatoms, such as O or N, to form one or two saturated 5-7-membered rings;

$$R_{25}—N=C=N—R_{26} \quad (d)$$

in which $R_{25}$ represents $C_1$-$C_{10}$ alkyl, $C_5$-$C_8$ cycloalkyl, $C_3$-$C_{10}$ alkoxyalkyl or $C_7$-$C_{15}$ aralkyl, $R_{26}$ has the same meaning as $R_{25}$ or represents a group corresponding to the following formula

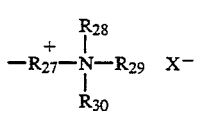

where $R_{27}$ is $C_2$-$C_4$ alkylene and $R_{28}$, $R_{29}$ and $R_{30}$ represent $C_1$-$C_6$ alkyl; one of the groups $R_{28}$, $R_{29}$ and $R_{30}$ may be substituted by a carbamoyl group or a sulfo group and two of the groups $R_{28}$, $R_{29}$ and $R_{30}$ may even be attached, together with the nitrogen atom, to form an optionally substituted heterocyclic ring, for example a pyrrolidine, piperazine or morpholine ring which may be substituted, for example, by $C_1$-$C_3$ alkyl or halogen, and X⁻ has the same meaning as defined for formula (a);

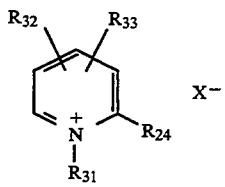
(e)

in which

X⁻ has the same meaning as defined for formula (a), $R_{24}$ has the same meaning as defined for formula (c), $R_{31}$ represents $C_1$-$C_{10}$ alkyl, $C_6$-$C_{15}$ aryl or $C_7$-$C_{15}$ aralkyl, either substituted or unsubstituted by carbamoyl, sulfamoyl or sulfo, $R_{31}$ represents $C_1$-$C_{10}$ alkyl, $C_6$-$C_{15}$ aryl or $C_7$-$C_{15}$ aralkyl, either substituted or unsubstituted by carbamoyl, sulfamoyl or sulfo, $R_{32}$ and $R_{33}$ represent hydrogen, halogen, acylamino, nitro, carbamoyl, ureido, alkoxy, alkyl, alkenyl, aryl or aralkyl or together the remaining members of a ring, more especially a benzene ring, fused to the pyridinium ring;

$R_{24}$ and $R_{31}$ may be attached to one another where $R_{24}$ is a sulfonyloxy group;

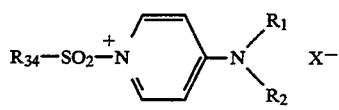
(f)

in which $R_1$, $R_2$ and X⁻ have the same meaning as defined for formula (a) and $R_{34}$ represents $C_1$-$C_{10}$ alkyl, $C_6$-$C_{14}$ aryl or $C_7$-$C_{15}$ aralkyl;

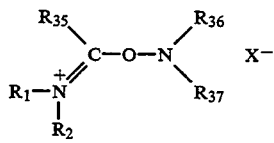
(g)

in which $R_1$, $R_2$ and X⁻ have the same meaning as defined for formula (a), $R_{35}$ represents hydrogen, alkyl, aralkyl, aryl, alkenyl, $R_{38}$O—, $R_{39}R_{40}$N—, $R_{41}R_{42}$C=N— or $R_{38}$S—, $R_{36}$ and $R_{37}$ represent alkyl, aralkyl, aryl, alkenyl,

$R_{44}$—$SO_2$ or $R_{45}$—N=N— or, together with the nitrogen atom, represent the remaining members of a heterocyclic ring or the group

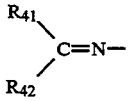

$R_{38}$, $R_{39}$, $R_{40}$, $R_{41}$, $R_{42}$, $R_{43}$, $R_{44}$ and $R_{45}$ represent alkyl, aralkyl, alkenyl, in addition to which $R_{41}$ and $R_{42}$ may represent hydrogen; in addition, $R_{39}$ and $R_{40}$ or $R_{41}$ and $R_{42}$ may represent the remaining members of a 5- or 6-membered, saturated carbocyclic or heterocyclic ring;

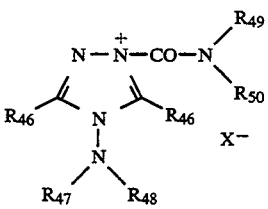

wherein $R_{46}$ represents hydrogen, alkyl or aryl, $R_{47}$ represents acyl, carbalkoxy, carbamoyl or aryloxycarbonyl;

$R_{48}$ represents hydrogen or $R_{47}$, $R_{49}$ and $R_{50}$ represent alkyl, aryl, aralkyl or, together with the nitrogen atom, represent the remaining members of an optionally substituted heterocyclic ring, for example a piperidine, piperazine or morpholine ring, which may be substituted for example by $C_1$-$C_3$ alkyl or halogen, and X⁻ has the same meaning as defined for formula (a);

A particularly preferred carboxyl activator is described in Rüger, U.S. patent application Ser. No. 07/817,629 filed Jan. 7, 1992 (equivalent to German Patent 41 19 982.0, filed Jun. 18, 1991) the disclosure of which is included herein by reference thereto and includes:

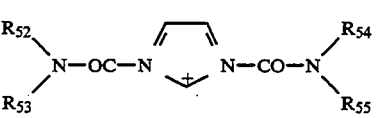
(j)

wherein $R_{52}$, $R_{53}$, $R_{54}$ and $R_{55}$ independently represent a substituted or unsubstituted alkyl of 1–3 carbon atoms, a substituted or unsubstituted aryl group of 6–14 carbons, a substituted or unsubstituted arylalkyl group of 7–20 carbons, $R_{52}$ and $R_{53}$ or $R_{54}$ and $R_{55}$ may be taken together to for a substituted or unsubstituted 5- or 6- membered saturated ring comprising carbon, oxygen, nitrogen or combinations thereof, X⁻ is an anion, the imidazole ring may be substituted with an alkyl group of 1–3 carbon atoms. Other useful carboxyl activators include, but are not limited to those described in U.S. Pat. No. 5,073,480; U.S. Pat. No. 4,877,724 and those discussed in M. Bodanszky, *Principles of Peptide Synthesis*, Springer-Verlag, 1984.

The term "gelatin" as used herein refers to the protein substances which are derived from collagen. In the context of the present invention "gelatin" also refers to substantially equivalent substances such as synthetic analogues of gelatin. Generally gelatin is classified as alkaline gelatin, acidic gelatin or enzymatic gelatin. Alkaline gelatin is obtained from the treatment of collagen with a base such as calcium hydroxide, for example. Acidic gelatin is that which is obtained from the treatment of collagen in acid such as, for example, hydrochloric acid and enzymatic gelatin is generated with a hydrolase treatment of collagen. The teachings of the present invention are not restricted to gelatin type or the molecular weight of the gelatin with the proviso that after preparation of the gelatin a sufficient number of pendant carboxylic acid groups remain for reactivity as taught herein. Carboxyl-containing polymers or copolymers can be modified as taught herein so as to lessen water absorption without degrading the desirable properties associated with such polymers and copolymers.

The formation of amides is preferably accomplished in solution at a pH which is above the isoelectric point of the gelatin. Carboxyl activator and the amine can be added sequentially or simultaneously. The addition sequence can effect the amount of derivatization due to the competition between the derivatization reaction and the gelatin crosslinking reaction. It is preferable to add the amine first followed by the carboxyl activator or to add the amine and carboxyl activator simultaneously.

Other nucleophiles are capable of reacting in a fashion similar to that taught herein whereby linkages which are comparable to amides are formed. Examples include but are not limited to alcohols, thiols, ethers and the like. A particularly preferred example includes compounds such as

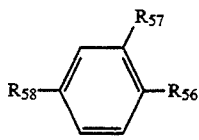

wherein
$R_{56}$ is —O—$(CH_2)_2$—O—$R_{59}$, with $R_{59}$ being H, —$CH_2$—$CH_2$—OH, —$CH_2$—$CH_2$—O—$CH_2$—OH, —O—Phenyl—OH, —$OCH_2CHOHCH_2OH$, —O—$(CH_2)_4CH_3$;
$R_{57}$ is H or —$OCH_3$; and
$R_{58}$ is H, —OH or —$CH_3$.
Other suitable alcohols are phenoxy-2-propanone, 2-methoxyethanol and 2-ethoxyethanol.

Gelatin which has been modified according to the teachings herein find exemplary utility as a binder in a photographic emulsion or as a means of suspending silver grains during the preparation thereof. Photographic emulsion which may be considered applicable to the teachings herein include, but are not limited to, positive and negative working systems. Other adjuvants may be added to the photographic emulsion as known in the art including, but not limited to, chemical and spectral sensitizers, brighteners, antifoggants and stabilizers, color materials, light scattering and absorbing materials, other binder additives, other hardeners, coating aids, plasticizers and lubricants, antistatic agents and layers, matting agents, development agents, development modifiers and the like as detailed in *Research Disclosure*, December 1989, Item 308119. It is typical to coat the photographic emulsion on a suitable support, followed by drying, exposing, processing and the like as reviewed in detail in *Research Disclosure*, December 1989, Item 308119.

Modification of a gelatin for use in a photographic element can be done after the photographic emulsion is prepared or the gelatin can be modified prior to addition to an emulsion. A particularly preferred method involves addition of a primary amine of the instant teachings to a photographic emulsion followed by addition of the carboxyl activator immediately prior to coating of the emulsion on a support.

The following illustrative examples further elaborate on the teachings herein and are not intended to limit the scope of the present invention. All parts and percentages are by weight unless otherwise indicated.

EXAMPLES

EXAMPLE 1

An 8% nondeionized gelatin solution was prepared at a pH of 5.80 with saponin present as a coating aid. The inventive samples were subjected to differing amounts of a chloride salt of carboxyl activator H-1 with one equivalent of 1-adamantaneamine (AA).

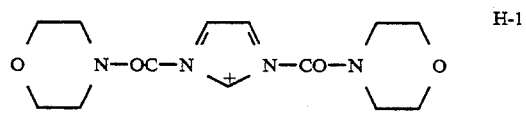

Controls were subjected to only the H-1 or formaldehyde. Both controls and inventive samples were coated with a 40 Mayer rod on a polyethylene terephthalate support which had been previously resin and gelatin coated as known in the art. The films were dried at room temperature for three days after which the meltpoint was measured in 0.1N NaOH. Water absorption was determined by weighing a dry 10×10 cm film sample, submerging the sample in deionized water for 30 minutes, allowing the excess water on the surface to drain off of the film, and weighing the swollen film. Water absorption (WA) was then defined as

TABLE 1

$$WA(mg/cm^2) = \frac{\text{Wet weight} - \text{Dry weight (mg)}}{100 \text{ cm}^2}$$

| Sample | Reactants | (mMol/g Gelatin) | Meltpoint (°C.) | WA |
|---|---|---|---|---|
| 1 Control | — | — | — | 9.0 |
| 2 Control | CH$_2$O | 0.035 | 55 | 4.9 |
| 3 Control | H-1 | 0.05 | 54 | 5.6 |
| 4 Control | H-1 | 0.10 | 74 | 5.0 |
| 5 Control | H-1 | 0.20 | 85 | 4.3 |
| 6 Inventive | H-1/AA | 0.05/0.05 | 40 | 4.9 |
| 7 Inventive | H-1/AA | 0.10/0.10 | 49 | 4.8 |
| 8 Inventive | H-1/AA | 0.20/0.20 | 77 | 4.3 |

At low levels of H-1/AA, such as sample 6, the meltpoint decreases relative to the control (sample 3) which utilized the same level of H-1 but was void of AA. This illustrates that the H-1 acts to derivatize the gelatin as opposed to exclusively crosslinking gelatin strands to form intermolecular or intramolecular crosslinks as described above. An additive which was nonreactive would not appreciably alter the melt point since a similar degree of crosslinking would be expected. The low level of H-1/AA in sample 6 also illustrates the decrease in the number of carboxyl groups as determined by a decrease in the water absorption versus the control sample 3.

EXAMPLE 2

A blue sensitive tabular AgBr grain X-ray emulsion was prepared in accordance with Fabricius and Welter, U.S. Pat. No. 5,108,887 with 0.64 grams of gelatin per gram of silver bromide. The resulting emulsion was treated with varying amounts of AA and coated at a silver coating weight of 2.2 g Ag/M. Formaldehyde or

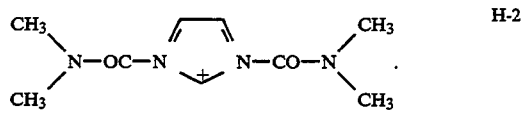

a chloride salt of H-2 hardener was added to the emulsion just prior to coating at a level of 0.115 mMol/g gelatin for H-2 or 0.17 mMol/g gelatin for formaldehyde. The films were stored under ambient conditions for two weeks and tested for meltpoint and water absorption as detailed above and for sensitometric performance in accordance with the method described in Fabricius referenced above. The data obtained is included in Table 2.

TABLE 2

|  | AA | Hardener | MP | WA | SP | MG | DM |
|---|---|---|---|---|---|---|---|
| Comparative | 0 | HCHO | 72 | 3.6 | 100 | 5.10 | 3.07 |
| Comparative | 0.05 | HCHO | 90 | 3.8 | 75 | 3.57 | 2.08 |
| Comparative | 0.15 | HCHO | 90 | 4.0 | 73 | 3.76 | 2.24 |
| Comparative | 0 | H-2 | 77 | 4.8 | 109 | 5.83 | 3.13 |
| Inventive | 0.05 | H-2 | 72 | 4.2 | 105 | 5.47 | 3.31 |
| Inventive | 0.15 | H-2 | 64 | 4.0 | 110 | 5.93 | 3.58 | wherein the amount of AA added is mMol/g gelatin, MP and WA are as described above, SP is relative photographic speed, MG is mid gradient, and DM is the maximum density obtained.

What is claimed is:

1. A silver halide photographic recording element comprising at least one layer comprising a modified gelatin formed from gelatin containing pendant amine groups and pendant carboxylic acid groups wherein at least one carboxylic acid moiety of said gelatin is modified to form a carbamoyl of the formula

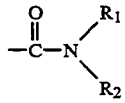

wherein

R$_1$ and R$_2$ independently represent hydrogen; unsubstituted alkyl of 1–10 carbons; alkyl of 1–10 carbons substituted with at least one substituent chosen from the group consisting of fluoride, chloride, and hydroxy; unsubstituted aryl of 6–14 carbons; aryl of 6–14 carbons substituted with at least one substituent chosen from the group consisting of fluoride, chloride, and hydroxy; unsubstituted arylalkyl of 7–20 carbons; or arylalkyl of 7–20 carbons substituted with at least one substituent chosen from the group consisting of fluoride, chloride, and hydroxy; with the proviso that at least one of R$_1$ or R$_2$ is chosen from the set consisting of t-butyl, cyclohexyl, norbornyl, norbornylenyl, norbornadienyl and adamantyl.

2. The silver halide photographic recording element recited in claim 1 wherein at least one of R$_1$ or R$_2$ is adamantyl.

3. A silver halide photographic recording element comprising at least one layer comprising a modified gelatin formed from gelatin containing pendant amine groups and pendant carboxylic acid groups wherein at least one carboxylic acid moiety of said gelatin is modified to form a carbamoyl of the formula

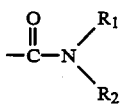

wherein

R$_1$ and R$_2$ independently represent hydrogen; unsubstituted alkyl of 1–10 carbons; alkyl of 1–10 carbons substituted with at least one substituent chosen from the group consisting of fluoride, chloride, and hydroxy; unsubstituted aryl of 6–14 carbons; aryl of 6–14 carbons substituted with at least one substituent chosen from the group consisting of fluoride, chloride, and hydroxy; unsubstituted arylalkyl of 7–20 carbons; or arylalkyl of 7–20 carbons substituted with at least one substituent chosen from the group consisting of fluoride, chloride, and hydroxy; with the proviso that at least one of R$_1$ or R$_2$ comprises fluoride.

* * * * *